UNITED STATES PATENT OFFICE.

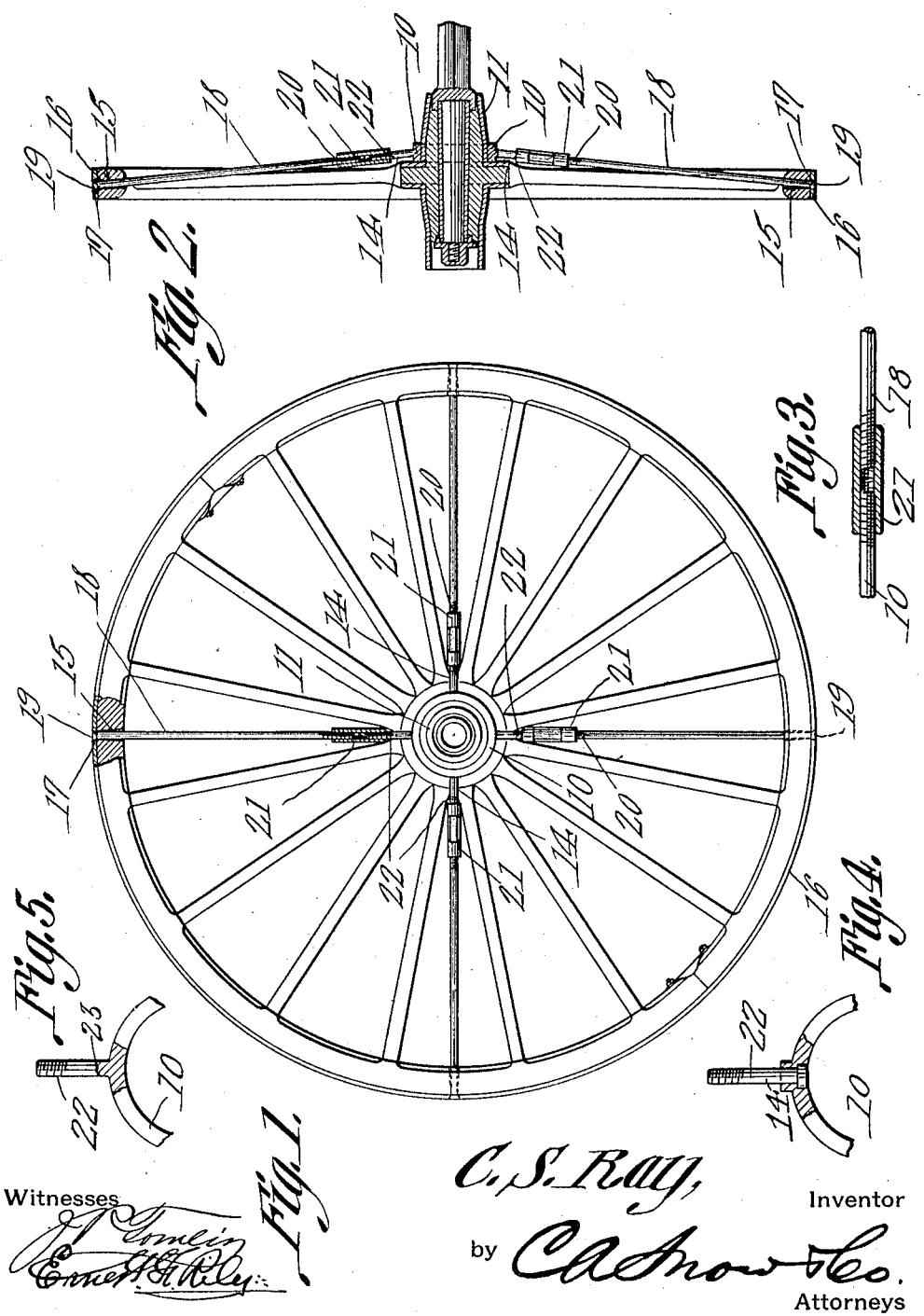

CARRY S. RAY, OF DUBLIN, TEXAS.

WHEEL-STRAIGHTENER.

1,039,193.  Specification of Letters Patent.  Patented Sept. 24, 1912.

Application filed February 5, 1912. Serial No. 675,486.

*To all whom it may concern:*

Be it known that I, CARRY S. RAY, a citizen of the United States, residing at Dublin, in the county of Erath and State of Texas, have invented a new and useful Wheel-Straightener, of which the following is a specification.

My invention relates to an improved wheel straightener.

The primary object of the present invention is to provide simple and efficient means for straightening wheels or taking the dish out of wheels and also to prevent wheels from becoming dished.

One advantage is that the wheels can be straightened without interfering with the tire and without removing the tire.

Another advantage is that the tire is necessarily tightened in the process of straightening the wheel. The tires are tightened on the wheels because the spokes are longer when set up straight or in their normal positions than when they are leaning over as in dished wheels.

Another advantage is that the front wheel and the rear wheel can be set exactly alike so that the rear wheel will run in the track of the front wheel and thus reduce the load or draft.

Other objects and advantages will be fully explained in the following description and the invention will be more particularly pointed out in the claim.

Figure 1 is a side elevation partly in section of the device upon a wheel. Fig. 2 is a section on the line 2—2 of Fig. 1. Fig. 3 is a section of the sleeve for regulating the tension of the straightening rods. Fig. 4 is a sectional detail of the connection of a rod with the hub member. Fig. 5 is a side elevation of the hub member, partly in section, showing a variation in the hub member.

Similar characters of reference are used to indicate the same parts throughout the several views.

In the drawings 10 designates an annular member which is adapted to embrace the hub portion 11 of the wheel, said annular member being formed with off-sets for receiving short members or rods 14. The rods 14 are inserted from the inside of the member 10 and have heads countersunk in the member 10, as shown in Fig. 4. The off-sets 12 have openings therethrough which aline with openings 15 formed in the felly of the wheel. The tire is provided with openings 17 which register with the openings 15. Arranged to extend through each opening 17 is a rod 18 which is provided with a beveled head 19, the wall of the opening 17 forming a seat for said head. The rods 18 are inserted from the outside through the tire and felly and the heads 19 are countersunk in the tire, as shown. The end portion 20 of each rod is screw threaded and a sleeve 21 which has a left interior thread at one end and a right interior thread at the other end, as shown in Fig. 3, embraces the end portion 20 and also embraces the screw threaded end 22 of the rod 14, forming a turn buckle by means of which the rod may be shortened or lengthened. The part 22 should have a left thread and the part 20 should have a right thread. The sleeve 21 is turned to shorten the rods 14 and 18 for drawing the wheel straight or to its normal position. The sleeves 21 are turned until the wheel has been brought to correct position, drawing the spokes from leaning positions until they are straight. This will make the spokes project farther radially and thus push the felly out against the tire. Both objects are accomplished simultaneously. In the form shown in the drawings four of these adjustable rods are employed but it will be noted that the number may vary in proportion to the size of the wheel, the same affording a simple and efficient wheel straightening and tire tightening mechanism which will retain the wheel in correct position and retain the tire and the felly together.

Instead of making detachable rods 14, the member 10 may be formed with members 23 integral therewith to take the place of the rods 14. The member 10 is placed on the inside of the hub which is opposite from the direction which the wheel is dished, the wheel being dished outwardly. This gives sufficient angle to make the straightening mechanism accomplish its function.

One of the resulting advantages of this invention is that the wheels are held in correct positions and run true and do not wear the spindles and boxing of the wheels.

Having fully described my invention, what I claim, is,—

A wheel straightener comprising an annular member engaging the inner end of the wheel hub and having a plurality of off-sets, an inner set of rods projected through said member and through the off-sets thereof at angles to the spokes of the wheel and having heads countersunk in the inner periphery of said member, an outer set of rods projected through the tire and felly of the wheel and having heads countersunk in the tire and having the inner ends threaded and coöperating with said inner set of rods, and internally threaded sleeves, each sleeve engaging the ends of two coöperating rods and all the sleeves serving to draw the inwardly projecting rods toward the outwardly projecting rods for drawing the spokes of the wheel from abnormal outwardly leaning positions to normal positions relative to the hub.

In testimony that I claim the foregoing as my own, I have hereto affixed my signature in the presence of two witnesses.

C. S. RAY.

Witnesses:
W. A. WILLIS,
J. W. STETT.

Copies of this patent may be obtained for five cents each, by addressing the "Commissioner of Patents, Washington, D. C."